(12) United States Patent
Vaninetti et al.

(10) Patent No.: US 11,919,643 B2
(45) Date of Patent: Mar. 5, 2024

(54) SELF-DEPLOYING COUNTER FOR MULTIMODE TRANSFORMABLE MONUMENTS

(71) Applicant: Rockwell Collins, Inc., Cedar Rapids, IA (US)

(72) Inventors: Travis J. Vaninetti, Bothell, WA (US); Justin C. Christenson, Everett, WA (US); Jefferey M. McKee, Duvall, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1017 days.

(21) Appl. No.: 16/421,207

(22) Filed: May 23, 2019

(65) Prior Publication Data

US 2019/0337623 A1 Nov. 7, 2019

Related U.S. Application Data

(63) Continuation-in-part of application No. 16/030,586, filed on Jul. 9, 2018, now Pat. No. 11,124,299, and a
(Continued)

(51) Int. Cl.
*B64D 11/00* (2006.01)
*A47B 31/04* (2006.01)
*A47B 31/06* (2006.01)

(52) U.S. Cl.
CPC .......... *B64D 11/0007* (2013.01); *A47B 31/04* (2013.01); *A47B 31/06* (2013.01); *B64D 11/0023* (2013.01); *B64D 2011/0038* (2013.01)

(58) Field of Classification Search
CPC ............ B64D 11/0007; B64D 11/0023; B64D 2011/0038; B64D 11/0691; B64D 11/04;
(Continued)

(56) References Cited

U.S. PATENT DOCUMENTS 1,412,367 A * 4/1922 Noack ................ B64D 11/0691
297/14
2,647,812 A * 8/1953 Saunders .............. F25D 25/027
312/294
(Continued)

FOREIGN PATENT DOCUMENTS

CN 103622319 A 3/2014
DE 102005043610 A1 3/2007
(Continued)

OTHER PUBLICATIONS

Office Action dated Aug. 26, 2019 for EP Application No. 19167878.8.
(Continued)

*Primary Examiner* — Medhat Badawi
(74) *Attorney, Agent, or Firm* — Suiter Swantz pc llo (57) ABSTRACT

A self-deploying counter for an aircraft monument is disclosed. In embodiments, the monument is installable adjacent to a cabin space within an aircraft passenger cabin (e.g., on either side of an exit door) and the self-deploying counter includes a partition door capable of being pivoted between a default closed position and an open position extending into the cabin space. The self-deploying counter has a horizontal top surface and an undersurface. When the partition door is deployed, the counter pivots in concert with the door's deployment, the fully deployed position corresponding to the open position of the partition door.

16 Claims, 9 Drawing Sheets

Related U.S. Application Data continuation-in-part of application No. 15/950,089, filed on Apr. 10, 2018, now abandoned, application No. 15/950,089, filed on Apr. 10, 2018.

(58) Field of Classification Search
CPC .... B64D 11/00; B64D 47/02; B64D 11/0015; B64D 11/003; B64D 11/0624; B64D 11/0639; B64D 2011/0046; A47B 31/04; A47B 31/06

See application file for complete search history.

(56) References Cited

U.S. PATENT DOCUMENTS

| | | | | |
|---|---|---|---|---|
| 2,763,900 A * | 9/1956 | Mcafee | B64C 1/1407 | 49/248 |
| 2,854,307 A * | 9/1958 | Londeree | A47B 77/04 | 312/247 |
| 3,472,219 A * | 10/1969 | Roy | A47B 51/00 | 126/37 R |
| 4,022,404 A * | 5/1977 | Greiss | B64D 11/0007 | 186/40 |
| 4,055,317 A * | 10/1977 | Greiss | B64D 11/00 | 244/119 |
| 4,221,529 A * | 9/1980 | DeShano | B60P 3/00 | 296/3 |
| 4,361,014 A * | 11/1982 | Blain | F25D 19/003 | 62/DIG. 13 |
| 4,375,876 A * | 3/1983 | Stewart | B64C 1/1407 | 244/129.5 |
| 4,478,467 A * | 10/1984 | Tyndall | B25H 1/12 | 312/258 |
| RE32,176 E * | 6/1986 | Vernon | B64D 11/04 | 186/40 |
| 4,679,749 A * | 7/1987 | Ryan | B64D 11/064 | 297/15 |
| D294,896 S * | 3/1988 | Weiss | D6/349 | |
| 4,776,903 A * | 10/1988 | Nordskog | B64D 11/04 | 312/409 |
| 4,799,632 A * | 1/1989 | Baymak | B64D 11/0691 | 297/14 |
| 4,913,487 A * | 4/1990 | Breckel | B64D 11/0691 | 297/14 |
| 4,993,666 A * | 2/1991 | Baymak | B64D 11/0691 | 297/14 |
| 5,090,639 A * | 2/1992 | Miller | B64D 9/00 | 244/137.1 |
| 5,224,297 A * | 7/1993 | Watkins | E05D 15/06 | 70/210 |
| 5,322,244 A * | 6/1994 | Dallmann | B64D 11/0007 | 244/118.1 |
| 5,907,127 A * | 5/1999 | Daoud | H02G 3/14 | D13/152 |
| 5,984,397 A * | 11/1999 | Dawson | B60N 2/307 | 297/14 |
| 6,007,025 A * | 12/1999 | Coughren | B64D 11/02 | 244/118.6 |
| 6,079,669 A * | 6/2000 | Hanay | B64D 11/02 | 4/312 |
| 6,177,887 B1 * | 1/2001 | Jerome | H04N 7/18 | 379/49 |
| 6,257,523 B1 * | 7/2001 | Olliges | B61D 17/048 | 244/129.5 |
| 6,318,672 B1 * | 11/2001 | Traylor | B64D 11/00 | 248/314 |
| D455,391 S * | 4/2002 | Granzeier | D12/345 | |
| 6,470,512 B1 * | 10/2002 | Lau | A47K 3/30 | 52/79.8 |
| 6,646,863 B1 * | 11/2003 | White | G06F 3/0202 | 361/679.2 |
| 6,691,952 B2 * | 2/2004 | Keogh | B64D 11/0604 | 5/118 |
| 6,761,332 B1 * | 7/2004 | Bengtsson | B64D 11/04 | 244/119 |
| 6,854,815 B1 * | 2/2005 | Smith | A47B 49/008 | 211/121 |
| 6,928,236 B2 * | 8/2005 | Suzuki | B64D 11/04 | 392/444 |
| 6,932,297 B1 * | 8/2005 | Steindl | B64D 11/02 | 248/680 |
| 7,142,417 B1 * | 11/2006 | Doebertin | B64D 11/04 | 361/679.02 |
| 7,584,926 B2 * | 9/2009 | Harrington | B64D 11/0007 | 212/312 |
| D604,254 S * | 11/2009 | Lanfear | D13/184 | |
| D610,554 S * | 2/2010 | Lanfear | D13/162 | |
| D611,005 S * | 3/2010 | Lanfear | D13/162 | |
| D611,006 S * | 3/2010 | Lanfear | D13/162 | |
| D615,045 S * | 5/2010 | Lanfear | D13/184 | |
| D631,446 S * | 1/2011 | Lanfear | D13/184 | |
| 7,954,761 B2 * | 6/2011 | Johnson | A47B 47/0041 | 312/111 |
| 8,519,824 B1 * | 8/2013 | Rankin | B64D 11/00 | 244/118.5 |
| 8,740,145 B2 * | 6/2014 | Wesselink | B64D 11/00 | 244/118.6 |
| 8,820,862 B1 * | 9/2014 | Erickson | B64D 11/00 | 312/257.1 |
| D730,804 S * | 6/2015 | Cuddy | D12/345 | |
| 9,387,932 B2 * | 7/2016 | Lee | B64D 11/04 | |
| 9,469,403 B2 * | 10/2016 | Lange | B64D 11/04 | |
| 9,650,146 B2 * | 5/2017 | Boenning | B60N 2/3097 | |
| 9,687,087 B1 * | 6/2017 | Artwohl | A47F 11/10 | |
| 2001/0050519 A1 * | 12/2001 | Kasuya | B64D 11/04 | 312/310 |
| 2005/0070152 A1 * | 3/2005 | Suzuki | B64D 11/04 | 439/501 |
| 2005/0087650 A1 * | 4/2005 | Quan | B64D 11/0604 | 244/118.6 |
| 2005/0116098 A1 * | 6/2005 | Martens | B64C 1/1469 | 244/118.5 |
| 2005/0121978 A1 * | 6/2005 | McAvoy | H02J 3/14 | 307/43 |
| 2005/0133308 A1 * | 6/2005 | Reysa | B64D 11/04 | 186/40 |
| 2005/0156560 A1 * | 7/2005 | Shimaoka | H02J 50/70 | 320/107 |
| 2005/0224646 A1 * | 10/2005 | Mills | B64D 11/04 | 244/118.5 |
| 2005/0230540 A1 * | 10/2005 | Harrington | B64D 11/04 | 244/118.2 |
| 2006/0060181 A1 * | 3/2006 | Sasaki | B64D 11/04 | 126/21 A |
| 2006/0060704 A1 * | 3/2006 | Lavie | A61G 3/001 | 244/118.5 |
| 2006/0145002 A1 * | 7/2006 | Van Loon | A47B 51/00 | 312/247 |
| 2006/0237182 A1 * | 10/2006 | Godecker | F25B 29/00 | 165/253 |
| 2007/0035919 A1 | 2/2007 | Doebertin et al. | | |
| 2007/0102579 A1 * | 5/2007 | Krieglsteiner | B64D 11/04 | 244/129.1 |
| 2007/0159035 A1 * | 7/2007 | Mullen | A47B 46/005 | 312/245 |
| 2007/0170310 A1 * | 7/2007 | Bock | B64D 11/0606 | 244/118.5 |
| 2007/0228216 A1 * | 10/2007 | Wenstrom | B64D 11/04 | 244/118.5 |
| 2008/0001031 A1 * | 1/2008 | Doebertin | B64D 11/04 | 244/118.1 |
| 2008/0150406 A1 * | 6/2008 | Arnold | B64D 11/04 | 312/237 |
| 2009/0102222 A1 * | 4/2009 | Kato | B60N 2/3011 | 297/361.1 |
| 2009/0112377 A1 * | 4/2009 | Schalla | G06Q 50/12 | 705/15 |
| 2009/0146005 A1 * | 6/2009 | Bettell | B64D 11/0643 | 244/118.6 |

(56) References Cited

U.S. PATENT DOCUMENTS

| | | | | |
|---|---|---|---|---|
| 2009/0206200 A1* | 8/2009 | Bolder | B64D 25/16 | 441/80 |
| 2009/0278429 A1* | 11/2009 | Erickson | B64D 11/0015 | 312/265.1 |
| 2009/0294586 A1* | 12/2009 | Brown | B64D 11/04 | 244/118.5 |
| 2009/0314889 A1* | 12/2009 | Baatz | B64D 11/0007 | 244/118.5 |
| 2009/0321574 A1* | 12/2009 | Erickson | F16B 21/06 | 29/525.01 |
| 2010/0001126 A1* | 1/2010 | Supan | B60N 2/01558 | 427/314 |
| 2010/0050665 A1* | 3/2010 | Oswald | F25D 17/06 | 700/282 |
| 2010/0071384 A1* | 3/2010 | Lu | F25D 15/00 | 62/3.2 |
| 2010/0116933 A1* | 5/2010 | Erickson | B64D 11/0696 | 248/503.1 |
| 2010/0140398 A1* | 6/2010 | Cunningham | A47J 39/006 | 99/290 |
| 2010/0155391 A1* | 6/2010 | Koschberg | B64D 11/04 | 219/391 |
| 2010/0219292 A1* | 9/2010 | Saint-Jalmes | B64D 11/0023 | 244/118.5 |
| 2010/0243800 A1* | 9/2010 | Koschberg | B64D 11/04 | 244/118.5 |
| 2011/0090064 A1* | 4/2011 | Dahms | G06Q 10/00 | 340/10.42 |
| 2011/0101160 A1* | 5/2011 | Gomes | B64C 1/1423 | 244/118.5 |
| 2011/0114788 A1* | 5/2011 | Mosler | B64D 11/0023 | 244/118.5 |
| 2011/0121134 A1* | 5/2011 | Schotte | B64D 11/064 | 244/118.5 |
| 2011/0148664 A1* | 6/2011 | Shiomori | B64D 11/04 | 340/945 |
| 2011/0210203 A1* | 9/2011 | Chua | B61D 37/006 | 244/118.5 |
| 2011/0210204 A1* | 9/2011 | Collins | B64D 11/0643 | 244/118.6 |
| 2011/0215199 A1* | 9/2011 | Lee | B61D 37/00 | 40/624 |
| 2011/0238742 A1* | 9/2011 | Birkmann | H04L 41/24 | 709/203 |
| 2011/0253837 A1* | 10/2011 | Lee | B64D 11/003 | 29/428 |
| 2011/0273849 A1* | 11/2011 | Jaeger | B64D 11/04 | 361/725 |
| 2011/0309746 A1* | 12/2011 | Eckel | H05B 47/18 | 315/297 |
| 2012/0047911 A1* | 3/2012 | Bhavsar | F25D 11/00 | 62/3.6 |
| 2012/0104165 A1* | 5/2012 | Dobrusin | B64D 11/0606 | 244/118.6 |
| 2012/0160111 A1* | 6/2012 | Hozumi | F24C 15/327 | 99/474 |
| 2012/0199695 A1* | 8/2012 | Isherwood | B64D 11/0691 | 244/118.6 |
| 2012/0217343 A1* | 8/2012 | Koschberg | B64D 11/04 | 29/469 |
| 2012/0248245 A1* | 10/2012 | Schliwa | B64D 11/003 | 244/118.5 |
| 2012/0248246 A1* | 10/2012 | Savian | B64D 11/003 | 244/118.6 |
| 2012/0261509 A1* | 10/2012 | Grant | B64D 11/02 | 4/664 |
| 2012/0273614 A1* | 11/2012 | Ehlers | B64D 11/04 | 244/118.5 |
| 2012/0298798 A1* | 11/2012 | Henshaw | B64D 11/06 | 244/118.6 |
| 2012/0318918 A1* | 12/2012 | Johnson | B64D 11/0604 | 5/2.1 |
| 2013/0082140 A1* | 4/2013 | Ehlers | B64D 11/02 | 244/118.5 |
| 2013/0126672 A1* | 5/2013 | Weitzel | B64D 11/064 | 244/118.6 |
| 2013/0187000 A1* | 7/2013 | Godecker | B64D 11/0007 | 244/118.5 |
| 2013/0206903 A1* | 8/2013 | Savian | B60Q 3/43 | 244/118.1 |
| 2013/0206904 A1* | 8/2013 | Gee | B64D 11/04 | 244/118.5 |
| 2013/0206905 A1* | 8/2013 | Savian | B64D 11/04 | 29/428 |
| 2013/0206906 A1* | 8/2013 | Burrows | B64D 11/0691 | 244/118.5 |
| 2013/0247590 A1* | 9/2013 | Lu | F25D 23/026 | 312/236 |
| 2013/0248649 A1* | 9/2013 | Burd | B64D 11/04 | 244/1 N |
| 2013/0248652 A1* | 9/2013 | Godecker | B64D 11/0015 | 244/118.5 |
| 2013/0248655 A1* | 9/2013 | Kroll | B64D 11/0604 | 244/118.6 |
| 2013/0257067 A1* | 10/2013 | Burd | E05C 19/06 | 292/200 |
| 2013/0259562 A1* | 10/2013 | Burd | B64D 11/04 | 403/187 |
| 2013/0270983 A1* | 10/2013 | Godecker | F25D 23/021 | 312/236 |
| 2013/0313365 A1* | 11/2013 | Ehlers | B64D 11/0691 | 244/118.6 |
| 2014/0008144 A1* | 1/2014 | Savian | B64C 1/066 | 181/290 |
| 2014/0008492 A1* | 1/2014 | Ehlers | B64D 11/00 | 244/118.5 |
| 2014/0027572 A1* | 1/2014 | Ehlers | B64D 11/06 | 244/118.6 |
| 2014/0048650 A1* | 2/2014 | Schliwa | B64D 11/0691 | 244/118.5 |
| 2014/0054416 A1* | 2/2014 | Lee | B64D 11/02 | 244/118.1 |
| 2014/0196206 A1* | 7/2014 | Savian | E04H 1/1216 | 4/664 |
| 2014/0209741 A1* | 7/2014 | Boenning | B64D 11/04 | 244/118.6 |
| 2014/0217239 A1* | 8/2014 | Ehlers | B64D 11/02 | 244/118.5 |
| 2014/0224930 A1* | 8/2014 | Ivester | B64D 11/04 | 244/118.5 |
| 2014/0224931 A1* | 8/2014 | Weitzel | B64D 11/0691 | 244/118.6 |
| 2014/0238064 A1* | 8/2014 | Hawkins | B64D 11/04 | 62/244 |
| 2014/0252830 A1* | 9/2014 | Johnson | B64D 11/0689 | 297/337 |
| 2014/0263835 A1* | 9/2014 | Godecker | B64D 13/08 | 244/118.5 |
| 2014/0291446 A1* | 10/2014 | Reams | B64D 11/02 | 244/118.5 |
| 2014/0319275 A1* | 10/2014 | Najd | B60N 2/3018 | 297/14 |
| 2014/0339363 A1* | 11/2014 | Moje | B64D 11/00 | 244/118.5 |
| 2014/0339364 A1* | 11/2014 | Ehlers | B64D 11/06 | 244/118.6 |
| 2014/0352929 A1* | 12/2014 | Wu | F25D 3/125 | 165/104.34 |
| 2014/0353425 A1* | 12/2014 | Boren, Jr. | B64D 11/04 | 244/118.5 |
| 2014/0355282 A1* | 12/2014 | Cuddy | B64D 11/00 | 362/471 |
| 2014/0359934 A1* | 12/2014 | Schliwa | B64D 11/02 | 4/300 |
| 2014/0367516 A1* | 12/2014 | Lange | B64D 11/04 | 414/630 |
| 2014/0367517 A1* | 12/2014 | Eckel | B64D 11/04 | 244/118.5 |

(56) References Cited

U.S. PATENT DOCUMENTS

| | | | |
|---|---|---|---|
| 2014/0373759 A1 | 12/2014 | Rumeau | |
| 2015/0028670 A1* | 1/2015 | Boodaghians | B64D 11/04 307/9.1 |
| 2015/0069179 A1* | 3/2015 | Ehlers | B64D 11/04 244/118.5 |
| 2015/0069891 A1* | 3/2015 | Schimanowski | B64D 11/04 312/242 |
| 2015/0097399 A1* | 4/2015 | Vue | B60N 2/38 29/428 |
| 2015/0251762 A1* | 9/2015 | Ehlers | B64D 11/064 244/118.6 |
| 2016/0167784 A1* | 6/2016 | Schliwa | B64D 11/0691 244/118.6 |
| 2016/0249073 A1* | 8/2016 | Margis | B64D 11/0638 |
| 2017/0101187 A1* | 4/2017 | Noske | B64D 11/0015 |
| 2017/0143566 A1* | 5/2017 | Elku | A61G 7/0506 |
| 2017/0179756 A1* | 6/2017 | Augustat | H02J 7/007192 |
| 2017/0309136 A1* | 10/2017 | Schoner | G06Q 10/087 |
| 2018/0049545 A1* | 2/2018 | Sagel | A47B 81/002 |
| 2018/0056846 A1* | 3/2018 | Nasiri | B64D 11/0604 |
| 2018/0142768 A1* | 5/2018 | Nolta | B60H 1/00842 |
| 2019/0039734 A1* | 2/2019 | Shah | G09F 27/00 |
| 2019/0308728 A1* | 10/2019 | McKee | B64D 11/0007 |
| 2019/0337623 A1* | 11/2019 | Vaninetti | B64D 11/0691 |
| 2020/0354060 A1* | 11/2020 | Vaninetti | A47B 31/06 |

FOREIGN PATENT DOCUMENTS

| | | |
|---|---|---|
| DE | 202015106958 U1 | 1/2016 |
| EP | 1125520 A1 | 8/2001 |
| EP | 2724938 A1 | 4/2014 |
| EP | 2808255 A2 | 12/2014 |
| EP | 3156331 B1 | 8/2018 |
| GB | 1599821 A | 10/1981 |
| WO | 2011160111 A1 | 12/2011 |
| WO | 2015014850 A1 | 2/2015 |

OTHER PUBLICATIONS

Examination Report for European Application No. 19167878.8 dated Apr. 28, 2021, 9 pages.

Extended Search Report for European Application No. 20175242.5 dated Oct. 20, 2020, 7 pages.

Examination Report for European Application No. 19167878.8 dated Oct. 13, 2020, 6 pages.

* cited by examiner

FIG. 7C

SELF-DEPLOYING COUNTER FOR MULTIMODE TRANSFORMABLE MONUMENTS

CROSS-REFERENCE TO RELATED APPLICATIONS

The present application claims priority under 35 U.S.C. § 120 as a continuation-in-part of co-pending U.S. patent applications Ser. No. 15/950,089 filed Apr. 10, 2018, and Ser. No. 16/030,586 filed Jul. 9, 2018. Said U.S. patent application Ser. Nos. 15/950,089 and 16/030,586 are herein incorporated by reference in their entirety.

BACKGROUND

Conventional aircraft monuments are purpose-built and generally inflexible products. The catering capacities and work/storage spaces of such monuments are not adaptable to multiple and diverse needs of cabin crew with respect to passenger catering. However, free space (e.g., space not already dedicated to passenger seating or storage) is extremely limited, especially in economy-class cabins, leaving few options to provide cabin crew with additional workspace. Similarly, from a passenger perspective, luxury-class aircraft provide entertainment and socialization spaces for their passengers. However, these amenities are rare in economy-class cabins for substantially the same reasons. Both single-aisle and larger twin-aisle aircraft may necessarily require free space immediately adjacent to their exit doors in order to facilitate safe, rapid evacuation of the aircraft under emergency conditions. However, under normal cruising conditions these spaces are left underutilized or unutilized.

SUMMARY

A self-deploying counter for an aircraft monument is disclosed. In embodiments, the monument is installable adjacent to a cabin space within an aircraft passenger cabin (e.g., on either side of an exit door) and the self-deploying counter includes a partition door capable of being pivoted between a default closed position and an open position extending into the cabin space. The self-deploying counter has a horizontal top surface and an undersurface. When the partition door is deployed, the counter pivots in concert with the door's deployment, the fully deployed position corresponding to the open position of the partition door.

A multimode transformable monument is also disclosed. In embodiments, the monument includes a structure positionable between the floor and ceiling of an aircraft passenger cabin, adjacent to a cabin space (e.g., the otherwise unused space directly in front of an exit door). The structure has an upper portion (adjacent to the ceiling), a lower portion (adjacent to the floor), and a middle portion between the upper and lower portions. The middle and lower portions include a partition door deployable by a user from a default closed position to an open position within the cabin space. The monument includes a counter having a horizontal top surface and an undersurface; the counter pivots in concert with the deployment of the door between a stowed position within the monument and a deployed position adjacent to and in front of the fully open partition door.

A system of multimode transformable monuments is also disclosed. The system includes a pair of multimode transformable monuments, or structures, positionable on either side of a cabin space in an aircraft passenger cabin (e.g., on either side of an exit door). Each structure has an upper portion (adjacent to the ceiling), a lower portion (adjacent to the floor), and a middle portion between the upper and lower portions. The middle and lower portions of each structure include a partition door deployable by a user from a default closed position to an open position within the cabin space, the two partition doors deploying toward each other across the cabin space. Each structure includes a counter having a horizontal top surface and an undersurface; the counters pivot in concert with the deployment of the partition doors between stowed positions within the monuments and deployed positions adjacent to each other in front of the fully open partition doors.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Figure 1:
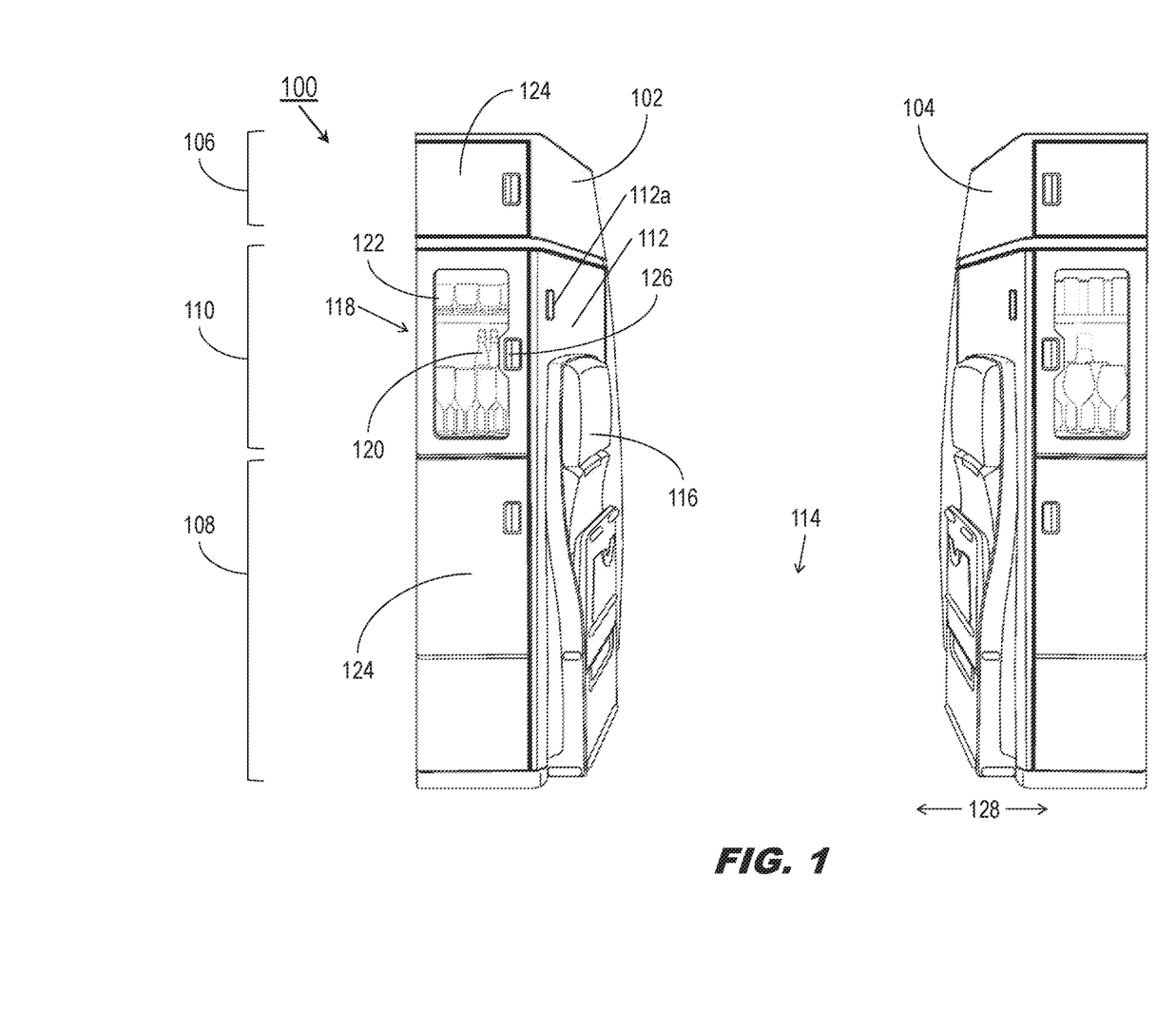
FIG. 1 is a forward view illustrating a system of multimode transformable monuments in accordance with example embodiments of this disclosure.

Referring to FIG. 1, a system 100 of multimode transforming monuments 102, 104 is disclosed. The monument 102 may include an upper portion 106, a lower portion 108, a middle portion 110, and a partition door 112 with grasping handle 112a. In embodiments, the monument 104 may include some or all of the same components as the monument 102, and may be mounted in an aircraft passenger cabin opposite the monument 102 adjacent to a cabin space 114. For example, either of the monuments 102, 104 may optionally include a cabin attendant seat 116 (CAS) attached thereto.

In some embodiments, either or both of the monuments 102, 104 may optionally include a self-service compartment 118 capable of storing refreshments 120, glassware 122, utensils, and other food service amenities accessible to passengers, e.g., when the system 100 is deployed at safe cruising altitudes. The upper portion 106 and lower portion 108 may include additional storage compartments (e.g., for emergency equipment or food service/catering amenities) accessible via doors 124. In embodiments, the self-service compartment 118 may be accessible through a partially or fully transparent door 126. In some embodiments, the self-service compartment 118 may be internally lit and/or climate controlled, e.g., via an integrated chiller device capable of maintaining the contents of the compartment at a controlled temperature.

In embodiments, the upper portion 106 may be adjacent to the ceiling of the aircraft, the lower portion 108 adjacent to the floor of the aircraft, and the middle portion 110 between the upper and lower portions. The system 100 may be positioned along a longitudinal aisle 128 of the aircraft (e.g., an aisle extending along the length of the passenger cabin, substantially parallel to a longitudinal or roll axis of the aircraft). For example, the cabin space 114 may be directly adjacent to an exit door of the aircraft. One or both of the CAS 116 may be deployed into the cabin space 114 by a cabin crewmember or flight attendant, e.g., for temporary occupancy during taxi, takeoff, and landing (TTL) flight segments when the monuments 102, 104 are otherwise in an undeployed state.

Figure 2:
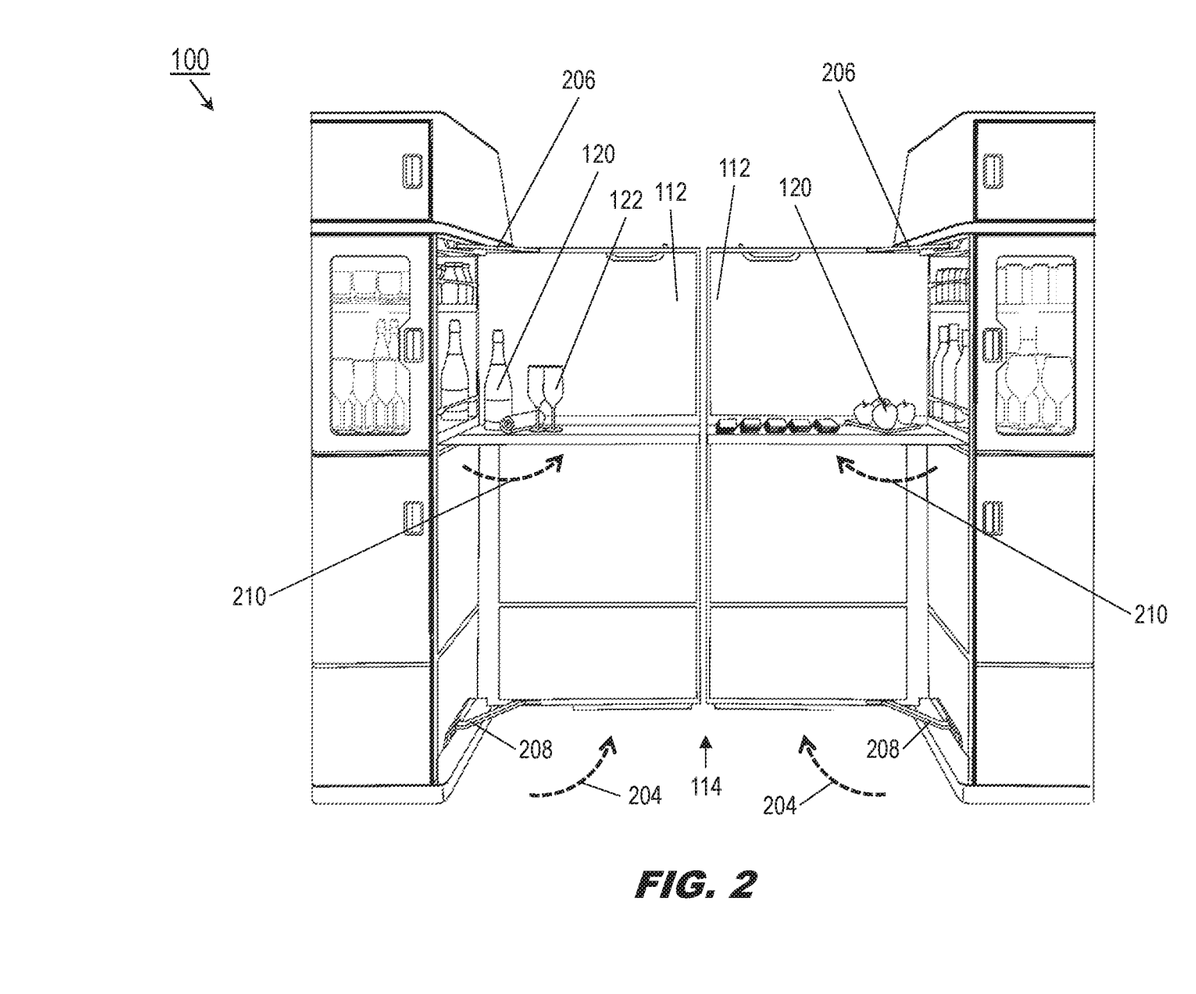
FIG. 2 is a forward view illustrating the system of FIG. 1 in a deployed state.

Referring to FIG. 2, the system 100 of multimode transforming monuments 102, 104 is disclosed. In embodiments, the monuments 102, 104 may include counters 202; the counters 202 may have a top surface on which refreshments 120, glassware 122, and other amenities may be arranged for inflight catering, passenger socialization, and self-service.

In embodiments, the monuments 102, 104 may be deployed (e.g., once the aircraft has reached safe cruising altitude and passengers are permitted to circulate around the cabin) by opening the partition doors 112 of one or both monuments into the cabin space 114. For example, the partition doors 112 may deploy toward each other (204) by pivoting at a substantially 90-degree angle from a closed position into an open position. Each partition door 112 may be connected to its respective monument 102, 104 by pivoting linkages 206, 208 which, when the partition door is deployed, constrain the movement of the partition door along a linear axis substantially parallel to the lateral depth of the monument (e.g., substantially parallel to a lateral axis of the aircraft, when the monuments are deployed to either side of an aircraft exit door). For example, each partition door 112 may be linked to its respective monument 102, 104 by an upper pivoting linkage 206 (linked to the monument at or near the top of the partition door) and a lower pivoting linkage 208 (linked to the monument at or near the bottom of the partition door). The deployed partition doors 112 may form a partition wall across the cabin space 114 (e.g., relative to the longitudinal aisle (128, FIG. 1). The partition doors 112 may remain locked or secured in the deployed state until closed by a cabin crewmember (e.g., when services are terminated).

In embodiments, the counters 202 may be stowed within the monuments 102, 104 and may deploy (210) in conjunction with the deployment of the partition doors 112 (e.g., from a stowed position inside the monuments 102, 104 (corresponding to the closed position of the partition doors as shown by FIG. 1) to a fully deployed position as shown by FIG. 2 (corresponding to the open position of the partition doors)). For example, a cabin crewmember may manually open the partition doors 112 via the grasping handles (112a, FIG. 1). As the partition doors deploy (204), the counters 202 may pivot and slide (210) into the fully deployed position.

Figure 3:
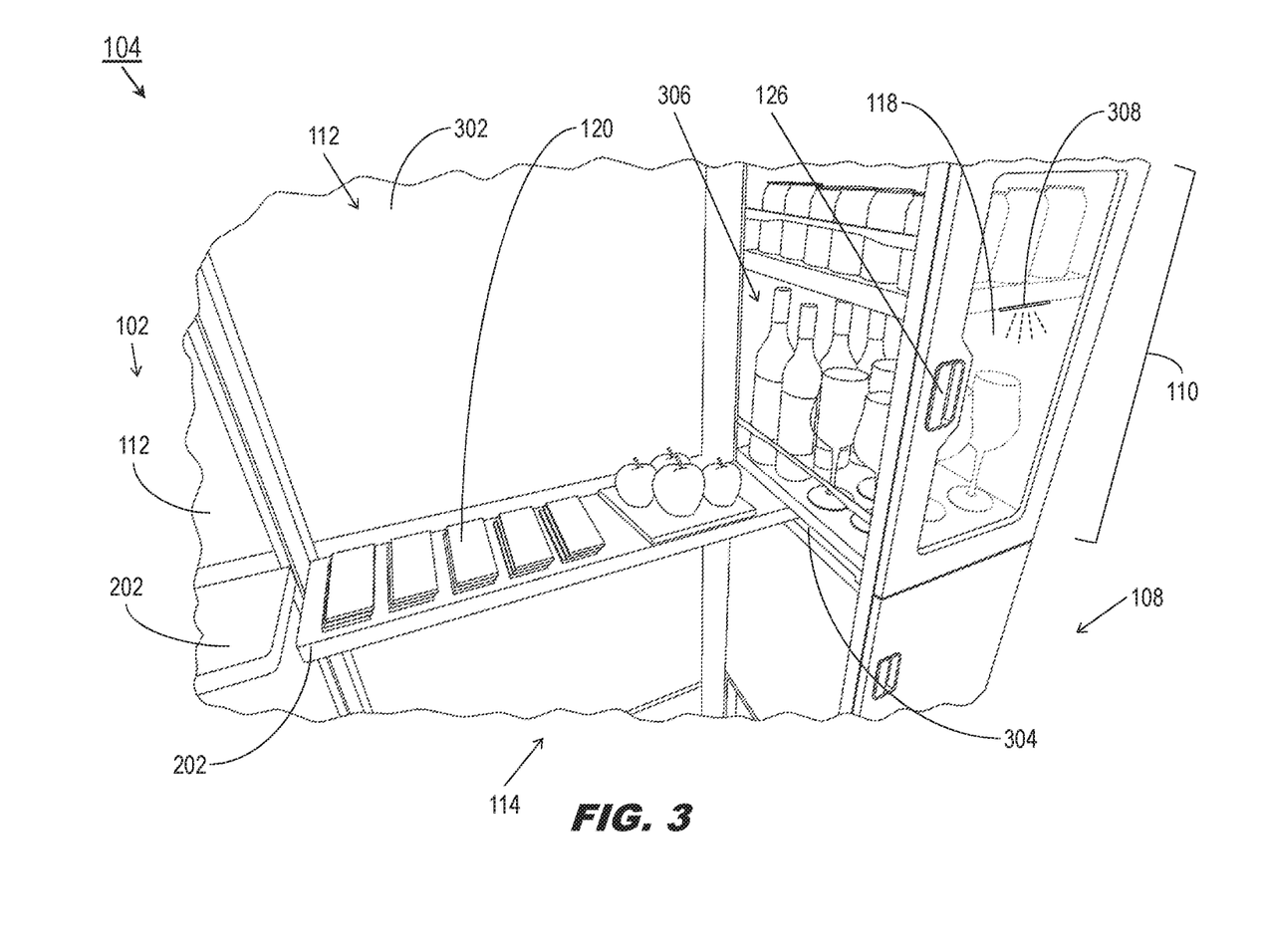
FIG. 3 is a detailed isometric view illustrating a deployable counter of the system of FIG. 1.

Referring to FIG. 3, the multimode transformable monument 104 is disclosed. In embodiments, when the partition doors 112 of the monument 104 (or the monument 102, FIG. 2) are deployed (204, FIG. 2) into the open position, the counters 202 may deploy from their stowed positions within the monuments, pivoting and sliding (210, FIG. 2) into a fully deployed position adjacent to the inside faces 302 of the open partition doors whereupon refreshments 120 may be arranged on the top surface of the counters. For example, the middle portion 110 (which may correspond to the self-service compartment 118) and the lower portion 108 of the monument 104 may be separated by a substantially horizontal counter slot 304 through which the counter 202 may deploy.

The self-service compartment 118 may be accessible to a passenger and crew via the compartment door 126. When the partition doors 112 and counters 202 are fully deployed, the deployment of the partition door 112 may additionally open the self-service compartment 118 to access from an adjacent side (306) of the self-service compartment, the adjacent side facing into the cabin space 114 between the two monuments 102, 104. In some embodiments, the self-service compartment 118 may include interior lighting (308) and/or an integrated chiller device for maintaining the contents of the self-service compartment at a controlled temperature.

Figure 4A:
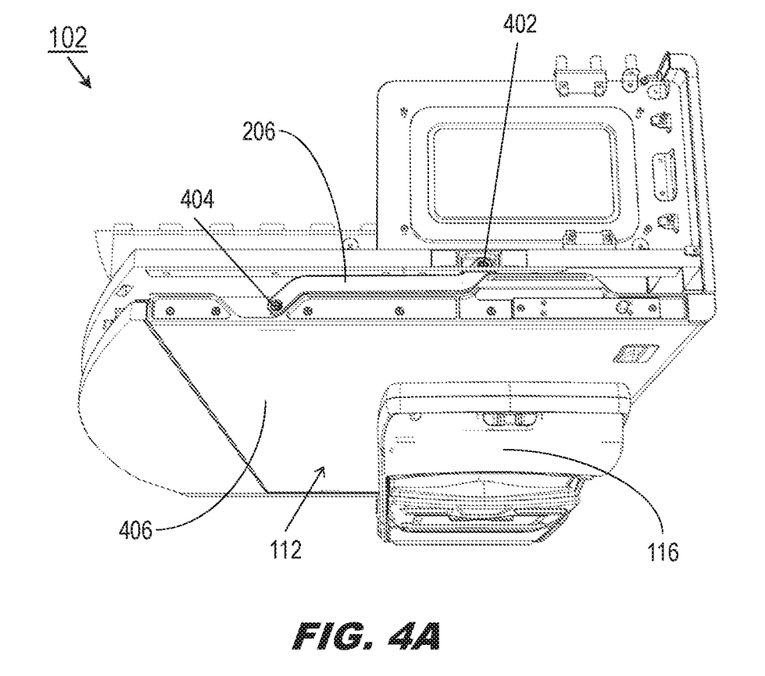
FIG. 4A is an overhead isometric view illustrating a pivoting linkage of the system of FIG. 1.
Figure 4B:
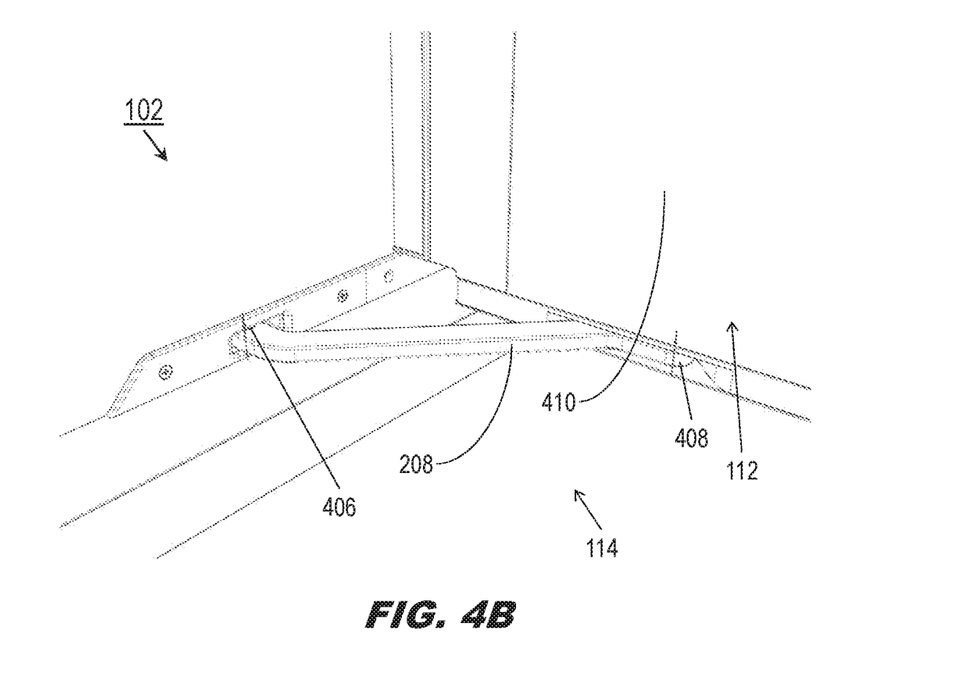
FIG. 4B is a detailed isometric view illustrating a pivoting linkage of the system of FIG. 4A.

Referring to FIGS. 4A and 4B, the multimode transformable monument 102 is shown. In embodiments, referring in particular to FIG. 4A, when the partition door 112 of the monument 102 is in a closed or undeployed position, the upper pivoting linkage 206 may rest above the partition door, substantially parallel to the outside face 406 of the partition door (e.g., to which the CAS 116 may be attached). For example, the upper pivoting linkage 206 may be pivotably connected to the monument 102 at an inner pivot point 402 and to the partition door 112 at an outer pivot point 404. The lower pivoting linkage 208 may be similarly aligned to the partition door 112 at or near the lower edge of the partition door.

In embodiments, referring in particular to FIG. 4B, when the partition door 112 of the monument 102 is in a fully open and deployed position, the lower pivoting linkage 208 may extend through the cabin space 114, linking the inner pivot point 406 within the monument 102 to the outer pivot point 408 to the inside face 410 of the partition door 112 (e.g., adjacent to which the counters (202, FIG. 2) deploy in conjunction with the opening of the partition door).

Figure 5A:
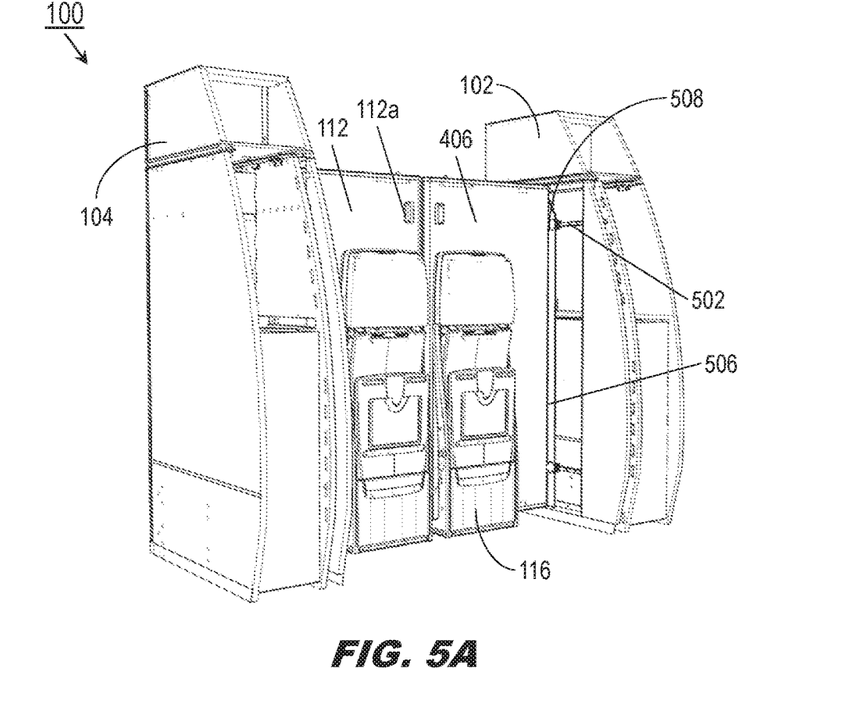
FIG. 5A is a reverse-angle isometric view illustrating the system of FIG. 1.
Figure 5B:
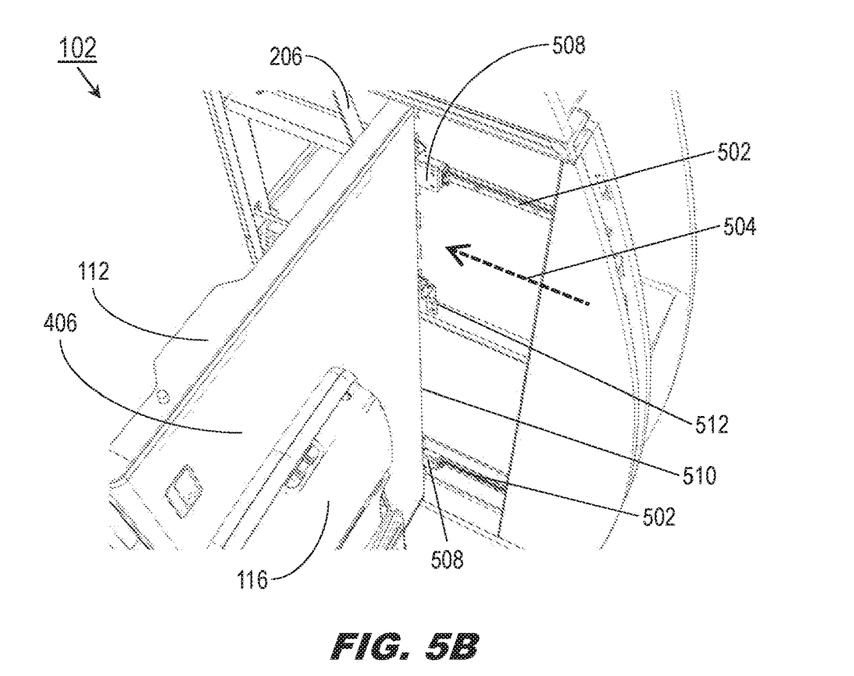
FIG. 5B is a detailed overhead isometric view illustrating a partition door of the system of FIG. 5A.

Referring to FIGS. 5A and 5B, the system 100 of multimode transformable monuments 102, 104 is shown in a fully deployed state from a reverse angle. For example, when the partition doors 112 are in a fully open position as shown by FIG. 5A, the outside faces 406 of said partition doors (e.g., to which the CAS 116 may optionally be mounted) may face toward the aircraft wall (e.g., or an exit door, on either side of which the monuments 102, 104 may be mounted) and away from the longitudinal aisle (128, FIG. 1).

In embodiments, the upper pivoting linkage 206 (and the lower pivoting linkage 208, FIG. 4B) may work in conjunction with additional hardware mounted within the monuments 102, 104 to pivot the partition doors 112 to the fully open position shown by FIGS. 5A and 5B (e.g., when the partition doors are opened via the grasping handles 112a). For example, the monuments 102, 104 may incorporate one or more monument rails 502 extending laterally (e.g., substantially orthogonal to the longitudinal aisle (128, FIG. 1) when the system 100 is mounted adjacent to an aircraft exit door) along the monument, defining a linear axis 504 along which the partition doors 112 translate while opening into the cabin space 114. While the partition door 112 pivots outward relative to a continuous hinge 506 (e.g., piano hinge), tracking members 508 mounted to the outside edge 510 of the partition door track forward (504) along the monument rails 502, pivoting the partition door through a substantially 90-degree angle. In some embodiments, stops 512 may be deployed to hold the opened partition doors 112 in their open position.

Figure 6A:
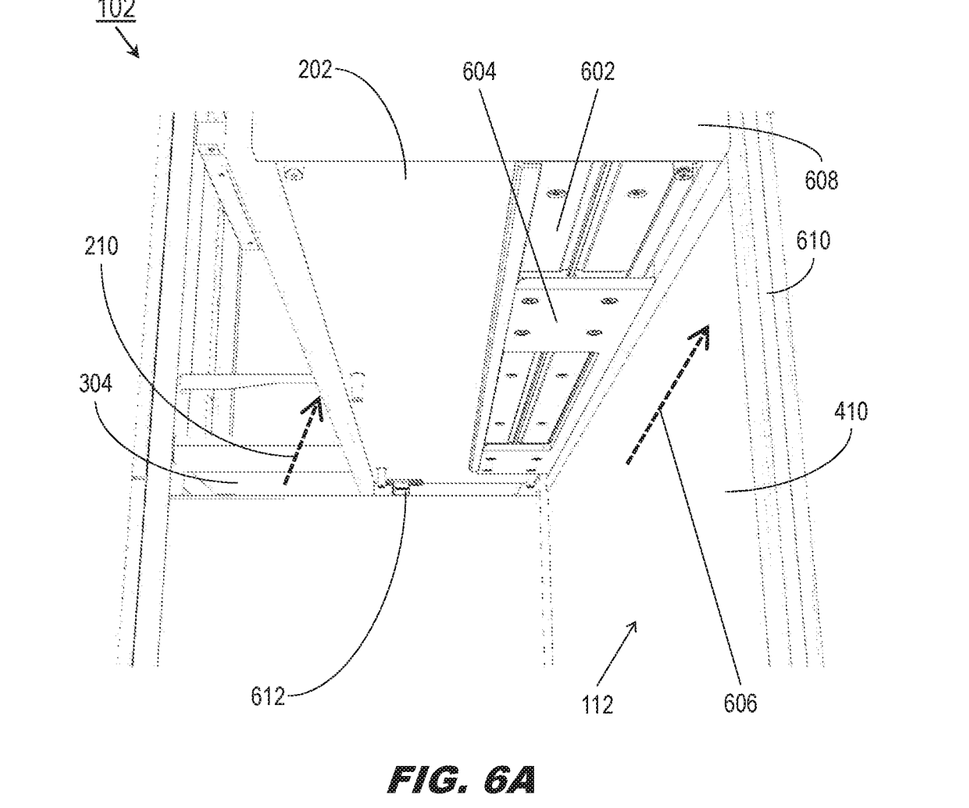
FIG. 6A is an underside isometric view illustrating a counter of the system of FIG. 1.
Figure 6B:
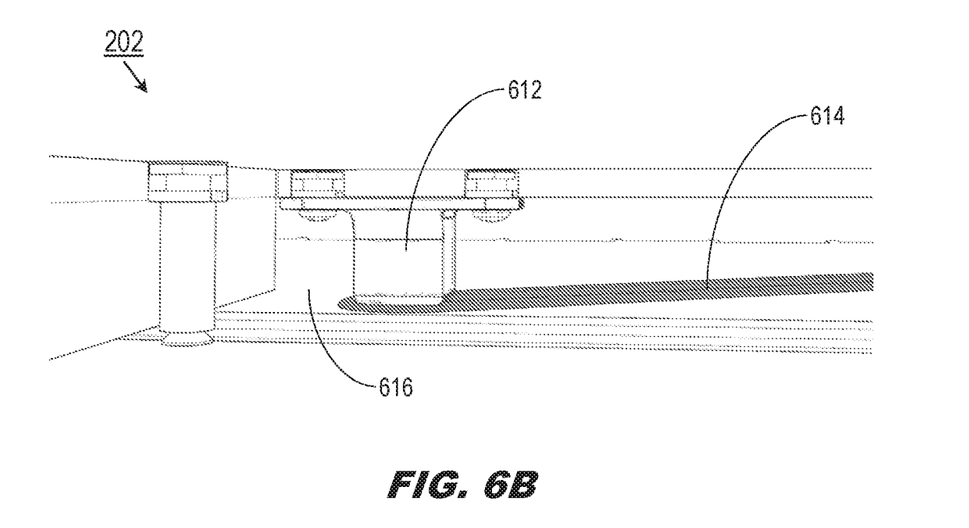
FIG. 6B is a detailed isometric view illustrating the counter of FIG. 6A.

Referring to FIGS. 6A and 6B, the transformable monument 102 and counter 202 are shown. For example, as the partition door 112 deploys from a closed position (as shown by, e.g., FIG. 4A) to an open position (as shown by, e.g., FIGS. 5A-B) the counter 202 similarly deploys from a stowed position within the monument 102 to the deployed position shown by FIG. 6A (e.g., orthogonal to the inside face 410 of the partition door 112), the position of the counter at any point determined by the position of the partition door.

In embodiments, the counter 202 may incorporate a counter rail 602 embedded in, or otherwise attached to, the underside (undersurface) of the counter. Sliders 604 mounted to the partition door 112 may translate along the counter rails 602. For example, the sliders 604 may be mounted to cantilevered structural elements to minimize shear forces, allowing the counter 202 to track laterally (606) across the inside face 410 of the partition door 112 as the partition door opens. When the partition door 112 is in a fully open position, the outside edge 608 of the counter 202 may substantially align with the outside edge 610 of the partition door.

In embodiments, the counter 202 may incorporate a tracking cam 612, e.g., attached to the undersurface of the counter. For example, as the partition door 112 opens, and the counter 202 deploys across the partition door via the sliders 604 and counter rails 602, the tracking cam 612 may translate through a cam track 614 embedded within the monument 102 (e.g., set into a horizontal surface 616 within the monument). For example, the cam track 614 may be curved to control the orientation of the counter 202 as the counter pivots (210) out of the monument 102 through the counter slot 304.

In some embodiments, the sliders 604 and their cantilevered structural elements may be mounted under the counters 202 while the counter rails 602 are mounted to the partition doors 112.

Figure 7A:
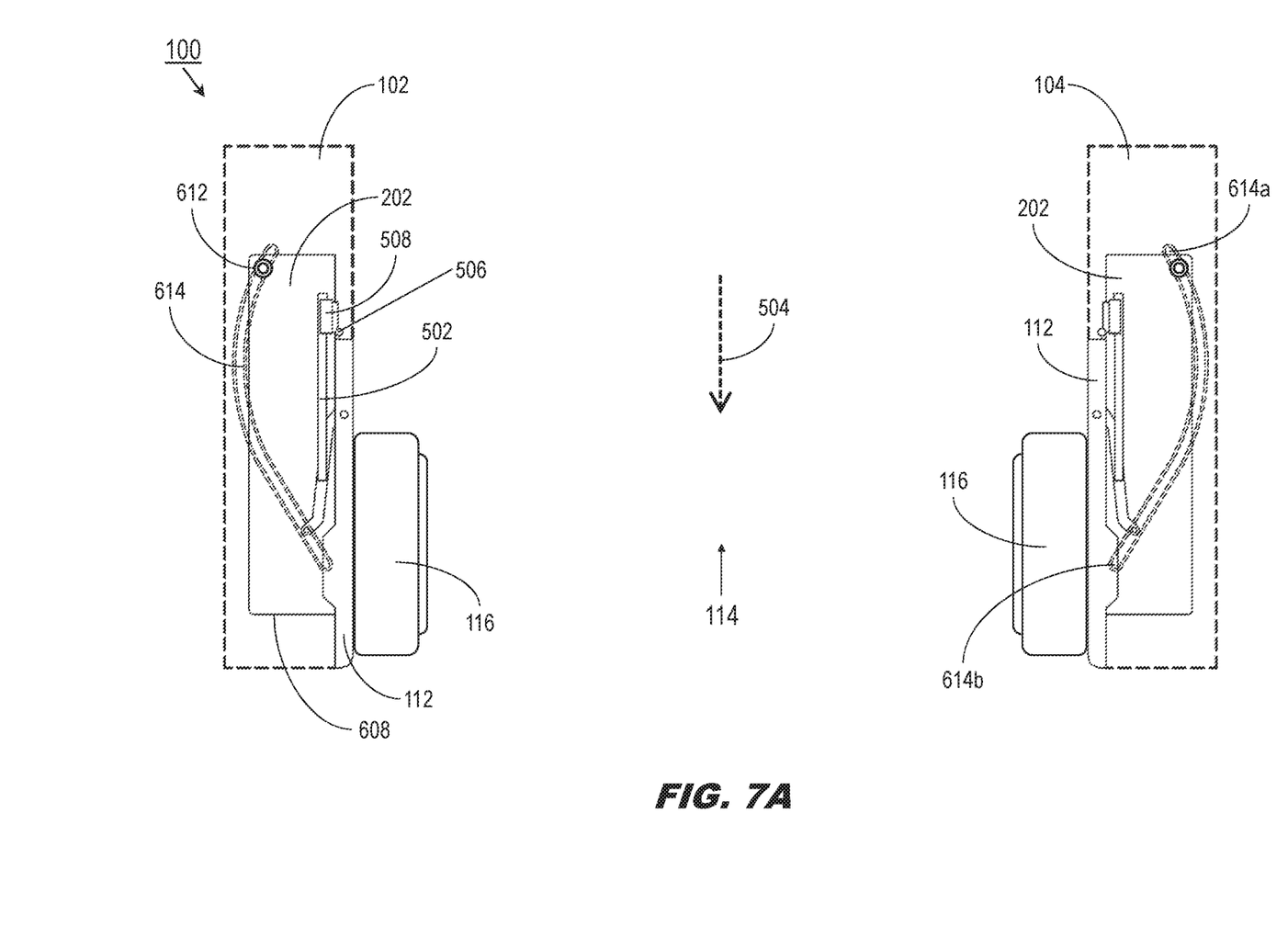
FIGS. 7A, 7B, and 7C are diagrammatic underside views illustrating the system of FIG. 1 in respectively an undeployed state, a partially deployed state, and a fully deployed state.
Figure 7B:
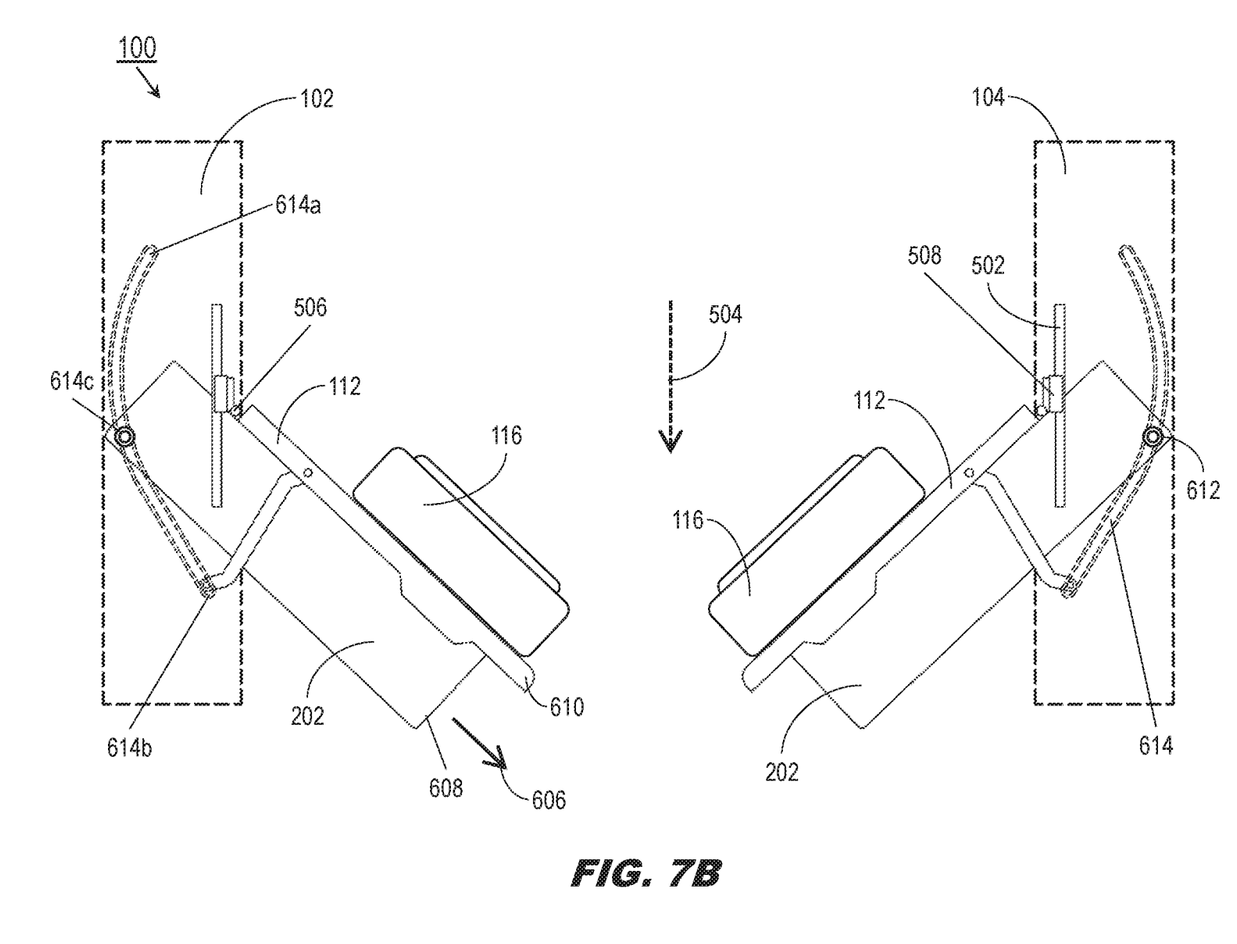
Figure 7C:
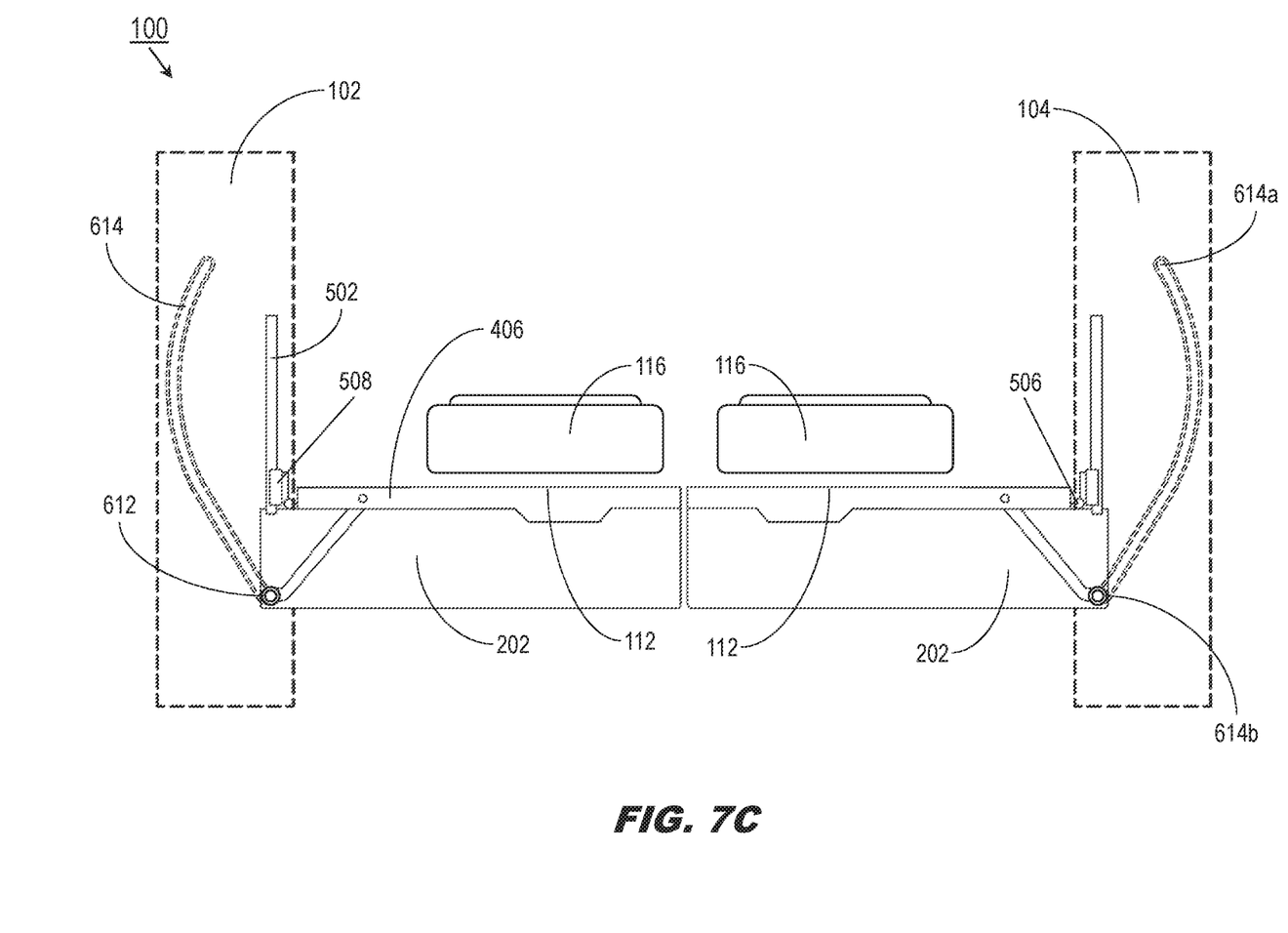

Referring to FIGS. 7A through 7C, the system 100 of multimode transformable monuments 102, 104 is shown. Each of the monuments 102, 104 may incorporate the monument rails 502, tracking members 508, and continuous hinge 506 for deployment of the partition doors 112 as well as the cam tracks 614 therewithin for simultaneous deployment of the counters 202. For example, the partition doors 112 may be deployed (204, FIG. 2) from the closed positions shown by FIG. 7A, to the partially open positions shown by FIG. 7B, to the fully open positions shown by FIG. 7C, the counters 202 tracking (210, FIG. 2) with the partition doors 112 depending on the current position of the partition doors. The partition doors 112 and counters 202 may be locked or otherwise held in their open and deployed positions (as shown by FIG. 4C) until returned to their closed and stowed positions (as shown by FIG. 4A) by cabin crewmembers, e.g., for descent and landing operations.

In embodiments, the cam tracks 402 may extend inside each monument 102, 104 and directly under the counters 202, which may be pivotably connected to the cam tracks via the tracking cams 612 mounted to the underside of the counters. For example, the partition doors 112 may be opened, e.g., via the grasping handles (112a, FIG. 1). As the partition doors 112 pivot open into the cabin space 114 relative to the continuous hinges 506, the partition doors track forward (504) as the tracking members 508 translate along the monument rails 502.

Simultaneously, the tracking cams 612 translate along the curved paths of the cam tracks 610 to drive the outside edges 608 of the counters 202 through the counter slots (304, FIG.

6A) and the door-mounted sliders (604, FIG. 6A) along the counter rails (602, FIG. 6A) embedded under the counters 202, such that the outside edges 608 of the counters 202 track laterally (606) toward the outside edges 610 of the partition doors 112. For example, the tracking cams 612 may track between an inside endpoint 614a and an outside endpoint 614b of the cam track 614. A position of the tracking cam 612 at the inside endpoint 614a may correspond to the fully stowed position of the counters 202 and the fully closed position of the partition doors 112 shown by FIG. 7A, while a position of the tracking cam at the outside endpoint 614b may correspond to the fully deployed position of the counters and the fully open position of the partition doors shown by FIG. 7C. The partially deployed position of the counters 202 and the partially open position of the partition doors 112 may correspond to a position 614c of the tracking cam 612 somewhere between the inside and outside endpoints 614a-b, as shown by FIG. 7B.

In embodiments, if a CAS 116 is mounted to the partition door 112 (e.g., to the outside face 406 of the partition door opposite the counter 202), when the partition doors 112 and counters 202 are in their fully open and deployed positions, as shown by FIG. 4C, the partition doors may block access to, and view of, the CAS 116. Similarly, if the system 100 of monuments 102, 104 is deployed adjacent to a cabin space 114 adjacent to an aircraft exit door, the deployed partition doors 112 may block passenger access to the exit door and prevent unauthorized use thereof.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A self-deploying counter assembly for an aircraft monument, comprising:
   a partition door pivotably and hingedly couplable to a monument by at least one pivoting linkage and at least one continuous hinge, the monument installable in an aircraft cabin, the partition door pivotably deployable by a user between a closed position and an open position within the aircraft cabin;
   at least one tracking member attached to the partition door, each tracking member configured to translate along a monument rail set into the monument as the partition door deploys; and
   a counter slidably coupled to the partition door and to the monument, the counter having a substantially horizontal top surface and an undersurface opposite the top surface, the counter configured to pivot with the deployment of the partition door between a stowed position and a deployed position corresponding to the open position of the partition door.

2. The self-deploying counter assembly of claim 1, further comprising:
   at least one tracking cam attached to the counter, each tracking cam configured to translate along a cam track set into the monument in accordance with the pivoting of the counter.

3. The self-deploying counter assembly of claim 2, wherein the cam track defines a curved path.

4. The self-deploying counter assembly of claim 1, wherein:
   the monument is disposed proximate to an exit door of the aircraft; and
   the partition door is configured to obstruct the exit door when in the open position.

5. The self-deploying counter assembly of claim 1, further comprising:
   at least one cabin attendant seat mounted to the partition door opposite the counter, the at least one cabin attendant seat deployable for use by a crewmember when the partition door is in the closed position.

6. The self-deploying counter assembly of claim 1, further comprising:
   at least one counter rail extending lengthwise along the undersurface of the counter; and
   at least one slider mounted to the partition door, the slider configured to translate along the counter rail as the partition door deploys.

7. A multimode transformable monument, comprising:
   an upper portion adjacent to the ceiling, a lower portion adjacent to the floor, and a middle portion between the upper and lower portions, the monument installable in an aircraft cabin;
   one or more of the middle portion and the lower portion comprising a partition door pivotably and hingedly coupled to the monument by at least one pivoting linkage and at least one continuous hinge, the partition door deployable by a user between a closed position and an open position within the cabin space;
   at least one tracking member attached to the partition door, each tracking member configured to translate along a monument rail set into the monument as the partition door deploys; and
   a counter slidably coupled to the partition door and to the monument, the counter having a substantially horizontal top surface and an undersurface opposite the top surface, the counter configured to pivot with the deployment of the partition door between a stowed position and a deployed position corresponding to the open position of the partition door.

8. The multimode transformable monument of claim 7, further comprising:
   at least one tracking cam attached to the counter, each tracking cam configured to translate along a cam track set into the monument in accordance with the pivoting of the counter.

9. The multimode transformable monument of claim 8, wherein the cam track defines a curved path.

10. The multimode transformable monument of claim 7, wherein:
   the monument is disposed proximate to an exit door of the aircraft; and
   the partition door is configured to obstruct the exit door when in the open position.

11. The multimode transformable monument of claim 7, further comprising:
- at least one cabin attendant seat mounted to the partition door opposite the counter, the at least one cabin attendant seat deployable for use when the partition door is in the closed position.

12. The multimode transformable monument of claim 7, further comprising:
- at least one counter rail extending lengthwise along the undersurface of the counter; and
- at least one slider mounted to the partition door, the slider configured to translate along the counter rail as the partition door deploys.

13. The multimode transformable monument of claim 7, further comprising:
- a self-service compartment disposed within the monument and adjacent to the counter, the self-service compartment comprising:
  - a first compartment door accessible by the user from a first side;
  - a second compartment door accessible by the user from a second side adjacent to the first side;
  - at least one shelf disposed within the self-service compartment; and
  - at least one interior light disposed within the self-service compartment and configured to illuminate one or more contents of the self-service compartment;
  - at least one of the first compartment door and the second compartment door having a substantially transparent surface.

14. The multimode transformable monument of claim 9, further comprising:
- at least one lighting element disposed on an exterior surface of the monument, the at least one edge lighting element configured to illuminate the aircraft cabin.

15. A multimode transformable monument of claim 10, wherein the monument is a first monument, the partition door is a first partition door, and the counter is a first counter, further comprising:
- a second monument disposed in the aircraft cabin on an opposite side of the exit door to the first monument, the second monument comprising:
  - a second partition door pivotably and hingedly couplable to the second monument, the second partition door pivotably deployable by the user between a closed position and an open position adjacent to the first partition door; and
  - a second counter slidably coupled to the second partition door and to the second monument, the second counter configured to pivot with the deployment of the second partition door between a stowed position and a deployed position adjacent to the deployed position of the first counter.

16. The multimode transformable monument of claim 15, further comprising:
- at least one self-service compartment disposed within at least one of the first monument and the second monument and adjacent to at least one of the first counter and the second counter, the self-service compartment comprising:
  - a first compartment door accessible by the user from a first side;
  - a second compartment door accessible by the user from a second side adjacent to the first side, at least one of the first compartment door and the second compartment door having a substantially transparent surface;
  - at least one shelf disposed within the self-service compartment; and
  - at least one interior light disposed within the self-service compartment and configured to illuminate one or more contents of the self-service compartment.

* * * * *